US011455882B2

(12) United States Patent
Baker et al.

(10) Patent No.: US 11,455,882 B2
(45) Date of Patent: Sep. 27, 2022

(54) ACTUATION MODULE TO CONTROL WHEN A SENSING MODULE IS RESPONSIVE TO EVENTS

(71) Applicant: Hewlett-Packard Development Company, L.P., Spring, TX (US)

(72) Inventors: Mary G. Baker, Palo Alto, CA (US); Eric Faggin, Palo Alto, CA (US); Rafael Ballagas, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/755,607

(22) PCT Filed: Oct. 31, 2017

(86) PCT No.: PCT/US2017/059288
§ 371 (c)(1),
(2) Date: Apr. 13, 2020

(87) PCT Pub. No.: WO2019/089001
PCT Pub. Date: May 9, 2019

(65) Prior Publication Data
US 2020/0334974 A1 Oct. 22, 2020

(51) Int. Cl.
*G08C 17/00* (2006.01)
*G06F 3/16* (2006.01)

(52) U.S. Cl.
CPC .............. *G08C 17/00* (2013.01); *G06F 3/167* (2013.01)

(58) Field of Classification Search
CPC ............................ G08C 17/00; G08C 2201/30; G08C 2201/31; G06F 3/167
See application file for complete search history.

(56) References Cited

U.S. PATENT DOCUMENTS

| 5,950,166 | A | 9/1999 | Hab-Umbach et al. |
| 8,523,771 | B2 * | 9/2013 | Stahmann .......... A61B 5/14546 600/483 |
| 8,885,860 | B2 | 11/2014 | Djalilian et al. |
| 9,549,273 | B2 | 1/2017 | Elkhatib et al. |
| 10,992,752 | B2 * | 4/2021 | Graefe .................. H04W 84/18 |
| 11,043,086 | B1 * | 6/2021 | Daoura .................. G08B 21/24 |
| 2005/0212753 | A1 * | 9/2005 | Marvit .................... G08C 17/00 345/156 |
| 2006/0287972 | A1 * | 12/2006 | Kelso .................. G06F 11/3058 |
| 2007/0236381 | A1 * | 10/2007 | Ouchi .................... G08C 23/04 340/539.11 |

(Continued)

OTHER PUBLICATIONS

Knowles Corp., "Knowles and Lenovo Collaborate on the Phab2 and Phab2 Plus to Enable More Voice Features and Clearer Calls Anytime, Anywhere". Sensory.com (blog post), Jun. 10, 2016, Available: https://www.sensory.com/knowles-lenovo-collaborate-phab2-phab2-plus-enable-voice-features-clearer-calls-anytime-anywhere/.

*Primary Examiner* — Fekadeselassie Girma
*Assistant Examiner* — Rufus C Point
(74) *Attorney, Agent, or Firm* — Conley Rose PC

(57) ABSTRACT

An actuation device includes a controller that interfaces with a sensing module to cause the sensing module to be non-responsive to events of a class that exceed the threshold level of detectability. The controller may be triggered by a corresponding sensor interface to switch the sensing module to be responsive to events of the class that exceed the threshold level of detectability.

20 Claims, 5 Drawing Sheets

(56) References Cited

U.S. PATENT DOCUMENTS

| | | | |
|---|---|---|---|
| 2009/0109350 A1* | 4/2009 | Koyama | H04N 9/3155 348/759 |
| 2010/0073443 A1* | 3/2010 | Jones | B41J 2/17593 347/88 |
| 2010/0121636 A1* | 5/2010 | Burke | G10L 25/78 704/E15.04 |
| 2010/0171693 A1* | 7/2010 | Tamura | G09G 5/003 312/7.2 |
| 2010/0207721 A1 | 8/2010 | Nakajima et al. | |
| 2011/0170224 A1* | 7/2011 | Gietler | H01F 7/1844 361/139 |
| 2012/0034904 A1* | 2/2012 | LeBeau | G10L 17/22 455/414.1 |
| 2012/0113209 A1* | 5/2012 | Ritchey | G02B 27/0179 348/14.02 |
| 2013/0076591 A1* | 3/2013 | Sirpal | H04M 1/0266 345/1.3 |
| 2013/0238326 A1* | 9/2013 | Kim | G10L 21/02 704/E15.001 |
| 2013/0271286 A1* | 10/2013 | Quan | G08B 5/00 340/691.6 |
| 2014/0167931 A1 | 6/2014 | Lee et al. | |
| 2014/0249820 A1* | 9/2014 | Hsu | G10L 15/22 704/251 |
| 2015/0106085 A1* | 4/2015 | Lindahl | G10L 15/32 704/231 |
| 2015/0205947 A1* | 7/2015 | Berman | G16H 40/67 726/16 |
| 2016/0028338 A1* | 1/2016 | Wichowski | G01R 23/02 318/400.37 |
| 2016/0077794 A1* | 3/2016 | Kim | G10L 15/20 704/275 |
| 2016/0260431 A1* | 9/2016 | Newendorp | G10L 15/32 |
| 2017/0068513 A1* | 3/2017 | Stasior | G10L 15/32 |
| 2017/0148307 A1* | 5/2017 | Yeom | G08B 29/185 |
| 2017/0161016 A1* | 6/2017 | McDunn | G06F 3/013 |
| 2017/0364324 A1* | 12/2017 | Lee | G06F 3/013 |
| 2018/0268747 A1* | 9/2018 | Braun | G09F 9/30 |
| 2019/0222652 A1* | 7/2019 | Graefe | H04W 84/18 |

* cited by examiner

```
┌─────────────────────────────────────────────┐
│  Performing At Least A First Action To Cause A Network-  │
│  Enabled Sensing Module To Be Non-Responsive To          │
│  Events Of A Class That Exceed The Threshold Level Of    │
│                    Detectability                          │
│                                              210          │
└─────────────────────────────────────────────┘
                        │
┌─────────────────────────────────────────────┐
│  While The Sensing Module Is Non-Responsive To Events    │
│   Of The Class, Monitoring A Given Region For A          │
│              Predetermined Type Of Event                  │
│                                              220          │
└─────────────────────────────────────────────┘
                        │
┌─────────────────────────────────────────────┐
│   In Response To Detecting The Predetermined Type Of     │
│  Event, Performing At Least A Second Action To Cause The │
│  Sensing Module To Be Responsive To Events Of At Least   │
│      The Class That Exceed The Threshold Level Of        │
│                    Detectability                          │
│                                              230          │
└─────────────────────────────────────────────┘
```

FIG. 2

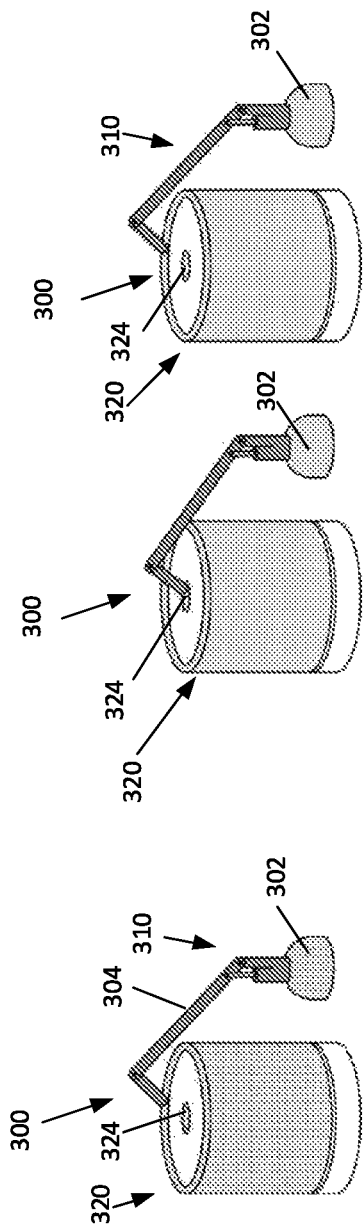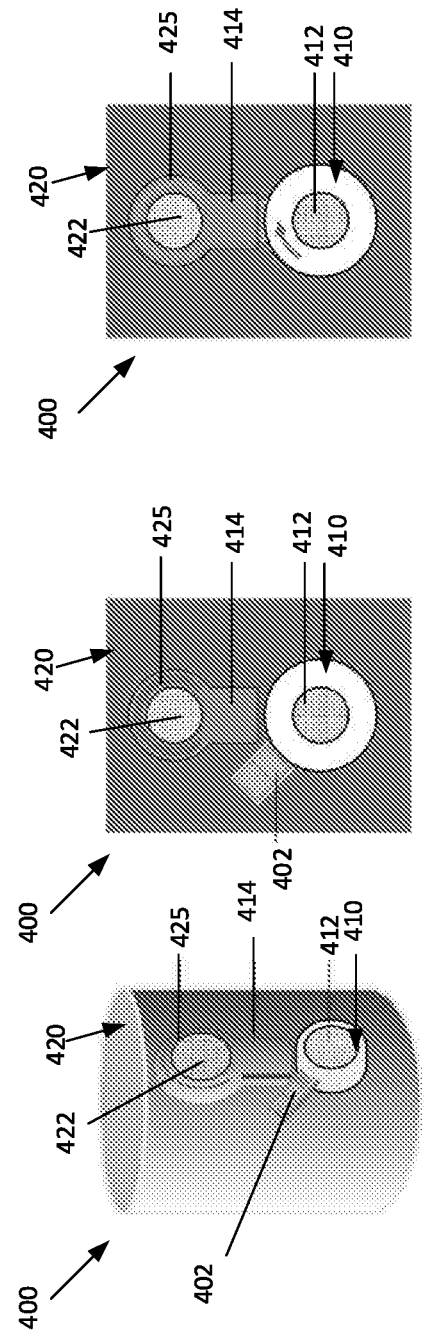

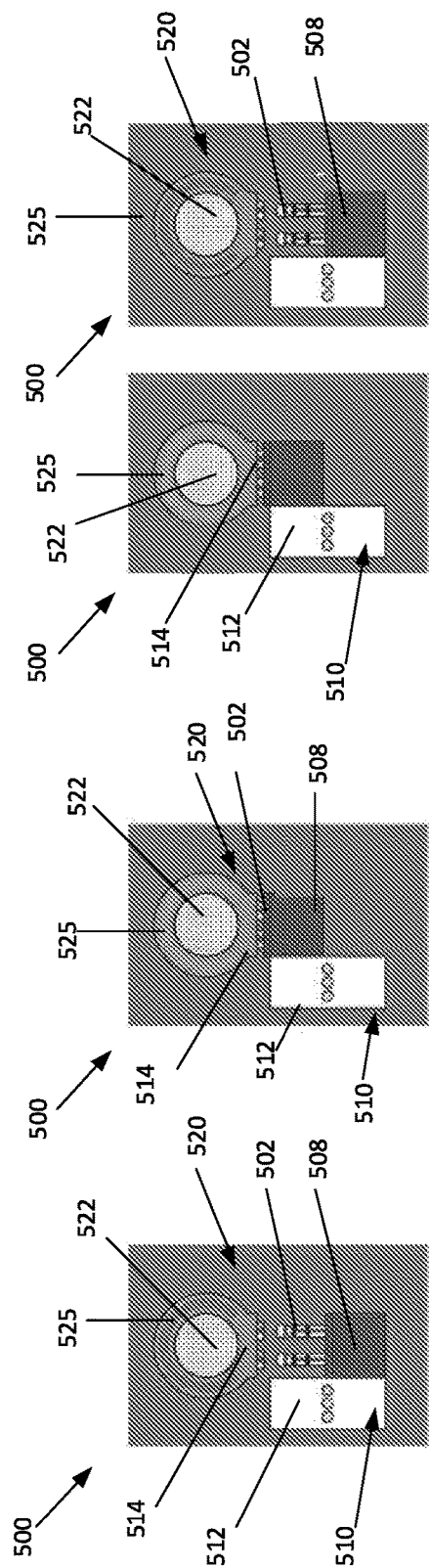
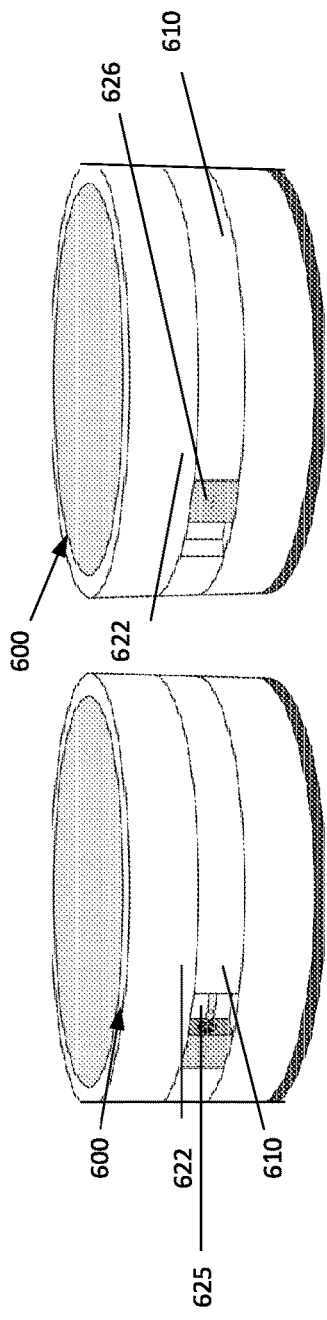

ACTUATION MODULE TO CONTROL WHEN A SENSING MODULE IS RESPONSIVE TO EVENTS

BACKGROUND

Smart devices exist in various forms. For example, personal computers (e.g., desktop computers, laptops) sometimes include programs or functionality which are responsive to human voice. Additionally, smart home assistants exist on various platforms to facilitate users with a variety of activities through use of voice commands. Typically, such devices utilize sensors to detect human actions while being connected to a network service or site where data that is generated in response to the detected human action may be transmitted and processed.

BRIEF DESCRIPTION OF FIGURES

FIG. 2 illustrates an example method for operating an actuation module to control a smart module.

FIG. 3A through FIG. 3C illustrate an example sensing device, having separate actuation and smart modules.

FIG. 4A through FIG. 4C illustrate an example sensing device, having an actuation module that is integrated with a network-enabled sensing device.

FIG. 5A through FIG. 5D illustrate another example sensing device having an integrated actuation and sensing device.

FIG. 6A and FIG. 6B illustrate another example of an integrated sensing device.

DETAILED DESCRIPTION

Figure 1A:
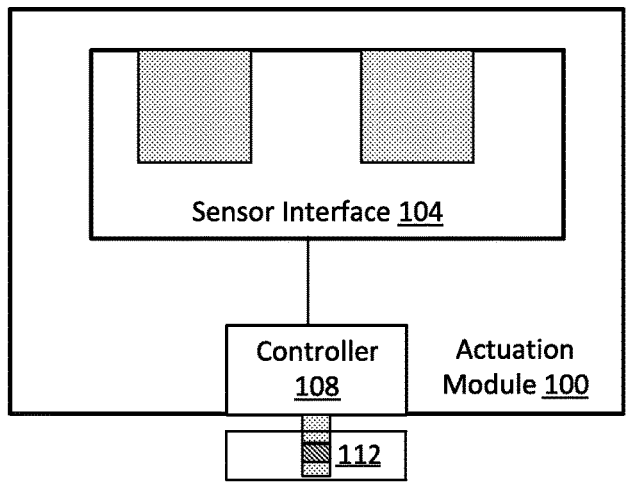
FIG. 1A illustrates an example actuation module for use with a smart module.

An actuation module is provided for use with a network-enabled sensing module, such as an intelligent personal assistant device or program (alternatively referred to as "smart module" or "smart device"). The actuation module may control an operational state of the sensing module, to cause the sensing module to switch from a non-responsive state to a responsive state. The actuation module may trigger a change in state of the sensing module as a response to the actuation module detecting a predetermined type of event. When the sensing module is in the non-responsive state, the sensing module is unable to respond to events which are detectable to a sensor interface of the sensing module.

As used herein, a smart module is a sensing module that can be implemented as a device, or hardware associated with a device, having associated logic (e.g., as implemented through hardware, firmware and software) and sensors that enable the device to be responsive to sensed activities that may be private or otherwise sensitive. Examples recognize that smart modules can respond to sensed activities in a variety of ways, such as by performing an action over an external network (e.g., using the World Wide Web), resulting in information about a sensed activity being communicated outside of a local domain of a user. In other variations, the smart module may record information about a sensed activity in a manner that is unwanted or outside of the control of the user, and thus subjecting the user to a potential loss of privacy. For example, the smart module may record activities in a local memory device that is accessible to third parties. In these and other context, examples provide for an actuation module that operates to preclude a smart module from being able to detect activities and/or respond to detected activities.

According to some examples, the actuation module includes a sensor interface to detect a class of predetermined events. When a predetermined event is detected, the actuation device causes the smart module to switch from a non-responsive state to a responsive state. In the responsive state, the smart module is able to use sensors to detect events within a given region and/or respond to detectable events while having network connectivity.

In examples, an actuation device includes a controller that controls an interface mechanism to a smart module. The interface mechanism may be used to interact with the smart module, to cause the smart module to be in the non-responsive state. The actuation module may utilize a sensor interface to trigger a corresponding sensor interface to switch the smart module from a non-responsive state to a responsive state, or from a responsive state to a non-responsive state.

According to some examples, an actuation module includes a sensor interface that is operable to sense a predetermined type of event in a given environment, and to generate a trigger signal upon sensing the predetermined event. The actuation module also includes a controller that interfaces with a network-enabled sensing module in response to detecting the trigger signal, where the sensing module is capable of detecting a class of events that exceed a threshold level of detectability. The controller may interface with the sensing module to cause the sensing module to be non-responsive to events of the class that exceed the threshold level of detectability until the controller is triggered by the sensor interface. The controller may respond to the trigger signal by causing the sensing module to be responsive to events of the class that exceed the threshold level of detectability.

With respect to examples described, events which are detectable to a sensor-equipped module or device are said to exceed a threshold level of detectability, meaning a sensed characteristic of the event (e.g., optical characteristic, auditory characteristic, electrical characteristic) has sufficient magnitude to be detectable by a corresponding sensor or sensor set of the respective sensor-equipped module or device.

Figure 1B:
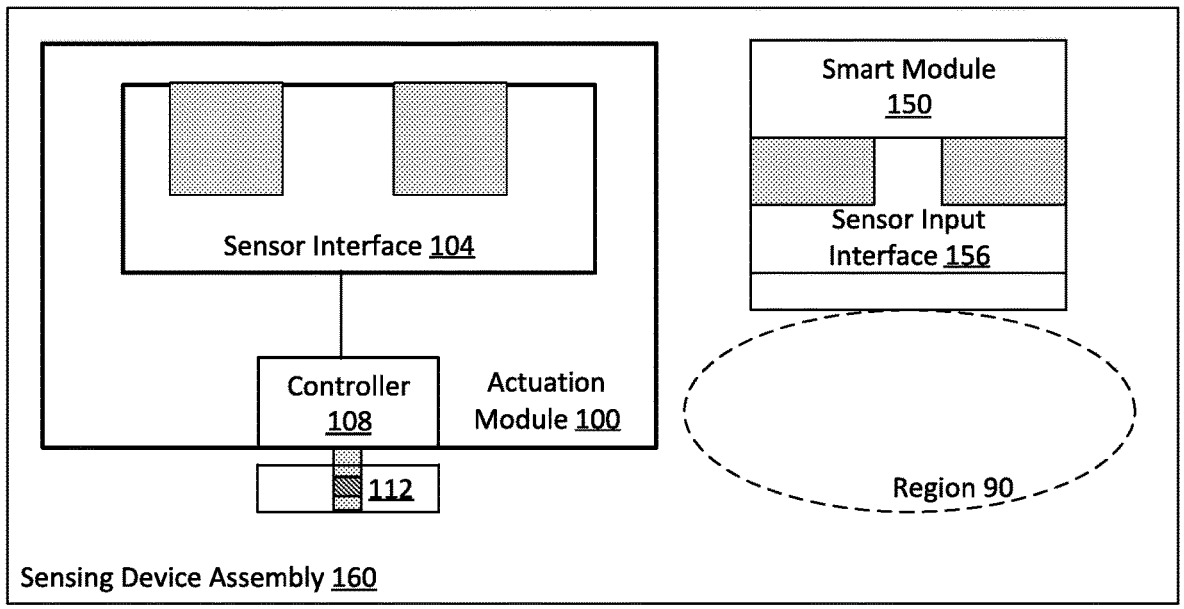
FIG. 1B illustrates a sensing device assembly which includes an actuation module and a smart module.
Figure 1C:
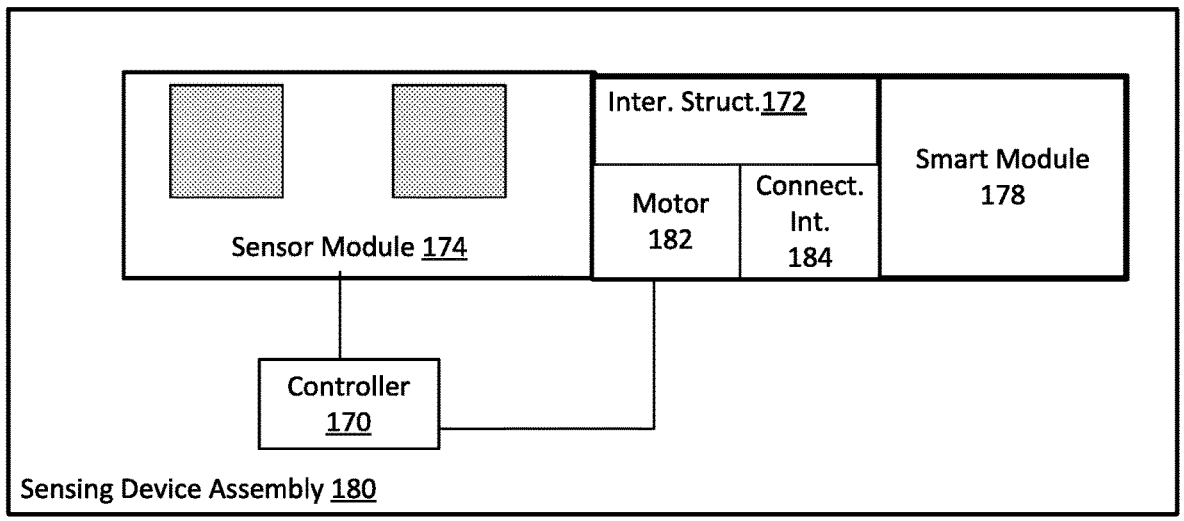
FIG. 1C illustrates a variation in which a sensing device includes an integrated actuation and smart module.

FIG. 1A illustrates an example actuation module for use with a smart module. In examples, an actuation module 100 is operatively coupled to control an operational state of a smart module (e.g., such as shown in FIG. 1B or FIG. 1C). The actuation module 100 may control an ability of a smart module to be responsive to detectable events (e.g., events detectable using sensors of the smart module). In this way, the actuation module 100 is able to preclude a smart module from detecting and/or responding to a user action which a user may consider private, or unintended for the smart module.

By way of example, the actuation module 100 may correspond to a self-contained module with an always-on microphone, camera and/or other sensory input. Depending on implementation, the actuation module 100 may be positioned, or otherwise coupled to respond to one or more of (i) a voice command, using a microphone, (ii) a gesture, using a camera and gesture recognition logic, (iii) user recognition, using a camera and corresponding recognition logic, and/or (iv) presence of a human, using an occupancy sensor. Among other benefits, the actuation module 100 can operate in connection with a smart module, to maintain the convenience of sensor-based activation (e.g., voice activation), without raising concerns that private activity and data will be transmitted outside of the user's network through operation of the smart module. In this way, the actuation module 100 can provide an always-on sensor to monitor for events (e.g., user voice command) that are predetermined and signify an acceptable user precondition for using the smart module. For example, the actuation module 100 may operate to switch the smart module into a responsive state upon detecting a predetermined event (e.g., voice command or utterance) which signifies the user intent to allow for use of the smart module. In other variations, the actuation module 100 may monitor for a particular user (e.g., adult in household) using a camera and recognition logic.

Still further, in other variations, the actuation module 100 monitors for users in a particular region (e.g., in proximity to the smart module), on the assumption that the user intends to interact with the smart module 150 when the user is standing near it. In such examples, the actuation module 100 may also prevent the smart module from responding to events that the smart module would otherwise detect and/or respond to (e.g., using a sensor interface and a network connection). In these and other examples, the actuation module 100 can limit the times when the smart module is available for use to those instances when the user intends to use the smart module, or is otherwise aware that the smart module is in a responsive state.

In some examples, the actuation module 100 can operate to visibly connect and/or disconnect the power and/or data of the smart module. In particular, the actuation module 100 and/or sensing device may include a visual indicator that indicates an operational state of the smart module.

As described by some examples, the actuation module 100 can be implemented as a stand-alone device that is structured to accessorize a particular type of smart module (e.g., accessory device). For example, the actuation module 100 may be structured to accessorize an intelligent personal assistant, such as, for example, a smart microphone or other device or appliance. Alternatively, the intelligent personal assistant can be implemented as a software program that executes on a desktop computer, laptop, tablet or mobile device. For example, a smart module can be implemented as a portable device, using hardware, firmware and/or logic and having an always on-setting in which the device is connected to a network and operates to sense and respond to sensed actions using the network. As an accessory, the actuation module 100 can be manufactured as an aftermarket component to provide an added utility to a manufactured class of smart module 150s. Specifically, the actuation module 100 may be implemented to restrict the ability of a smart module to respond to an event that would otherwise be detectable to the smart module.

The actuation module 100 can be structured or made operative for a particular form factor or class of smart modules. In variations, the actuation module 100 may include mechanical and/or electrical features that are specifically structured for a particular form factor and/or functionality of a smart module. In such examples, the actuation module 100 can mechanically and/or electrically connect to the smart module to preclude network communications that reflect unwanted responsive behavior by the smart module.

In variations, the actuation module 100 may be implemented as an integral component of a smart module. Still further, in other variations, the actuation module 100 may be combined with a smart module to form a network-enabled sensing assembly. These and other examples are described in greater detail below.

With further reference to an example of FIG. 1A, the actuation module 100 includes a sensor interface 104 and a controller 108 that can utilize an electrical and/or mechanical interface to control an operative state of a corresponding smart module. The controller 108 includes an interface mechanism 112 that can, depending on implementation, electrically or mechanically interact with a smart module. The sensor interface 104 may include, for example, audio sensors (e.g., microphones), occupancy sensors, optical sensors, touch sensors or other forms of sensors which can detect or recognize objects and/or sounds within a surrounding region. The controller 108 may include logic to process a sensor signal of the sensor interface 104 in connection with operation of the interface mechanism 112.

In some examples, the interface mechanism 112 includes a controlled mechanical element that can be operated in one or multiple states, based on a sensor signal of the sensor interface 104. In a variation, the interface mechanism 112 may be implemented to include a circuit or switch element that is operatively connected to the smart module, such that the circuit or switch element is responsive to the sensor signal of the sensor interface 104.

In variations, the actuation module 100 is operable to use the sensor interface 104 to detect a condition or event within a surrounding region. In response to detecting the condition or event, the actuation module 100 uses the controller 108 to switch an associated smart module from an unconnected and/or a non-responsive state, into a responsive and connected state, such that the smart module can detect actions in the surrounding area, and further respond to the actions using a network connection. Thus, the actuation module 100 may preclude or otherwise inhibit the smart module from responding to detectable actions of the surrounding environment, using a network connection. As described with some examples, the actuation module 100 may use the controller 108 to switch any one or more of a sensing ability of the smart module, a network connectivity of the smart module, and/or a power level of the smart module.

FIG. 1B illustrates a sensing device assembly which includes an actuation module, such as described with an example of FIG. 1A. In FIG. 1B, an assembly 160 includes the actuation module 100 and a smart module 150. In an example of FIG. 1B, the smart module 150 corresponds to, for example, a "smart speaker" or appliance. In variations, the smart module 150 may correspond to another type of device, such as a portable computing device. By way of example, the smart module 150 includes a sensor interface 156 that can detect a particular type of user activity which exceeds a threshold level of detectability. For example, the sensor interface 156 may include a microphone to detect a user utterance (e.g., spoken word, sentence, etc.) and/or a camera to detect an image. In operation, the smart module 150 monitors a surrounding region 90 (e.g., a room, or portion of a dwelling) to detect events or conditions that exceed the threshold.

According to some examples, the assembly 160 is operable in at least a default state and a triggered state. In the default state, the actuation module 100 causes the smart module 150 to be non-responsive to events of a category that exceed the threshold level of detectability. In some examples, the actuation module 100 may cause the smart module 150 to be in a non-responsive state by manipulating the interface mechanism 112 of the controller 108 with a state switch that enables (e.g., powers on) the sensor interface 156, a network interface of the smart module, and/or an overall power level of the smart module 150.

In such examples, the controller 108 may be operatively linked to a state switching mechanism of the smart module 150. The state switching mechanism may coincide with, for example, a user-actuated switch that can power the smart module 150 (or select components of the smart module, such as a network interface) into a low-power or unconnected state, such as when the smart module 150 is asleep and cannot detect other objects using its sensor interface 156, and/or without network connectivity. For example, the interface mechanism 112 may be implemented as a mechanical lever that extends from a base of the sensor interface 104 to switch (e.g., push button) an actuation mechanism of the smart module 150 by force and/or contact. In the default state, the interface mechanism 112 of the controller 108 may force an interaction with the actuation mechanism of the smart module to cause the smart module (or its components) to be in a low power state.

By way of example, the controller 108 may preclude the smart module from sensing an event that the smart module would otherwise sense. As an addition or variation, the controller 108 may preclude the smart module from sensing a presence of a person in the surrounding environment (e.g., using an optical or presence sensor), or from detecting an utterance of a user (e.g., user speaking a word or sentence).

In an example in which the interface mechanism 112 mechanically interacts with the smart module, the default state may provide that the interface mechanism 112 mechanically occludes (e.g., covers, overlays, wraps over) or otherwise interferes with the sensor interface of the smart module.

In such examples, variations may also provide for the sensor interface 104 to detect the state of the switching mechanism on the smart module. By detecting the state of the switching mechanism, the controller 108 can use the interface mechanism 112 to automatically implement an off-state on the smart module. For example, the controller 108 may utilize an input from the sensor interface 104 to detect a state indicator (e.g., illumination characteristic, switch position etc.) of the switching mechanism on the smart module 150. For example, the actuation module 100 may utilize the sensor interface 104 to detect a physical position or illumination characteristic (e.g., red or green) of the state indicator of the smart module 150.

In variations, the actuation module 100 may utilize a camera to detect (i) a relative orientation of the actuation module 100 with respect to the smart module, (ii) an orientation or position of a switching mechanism of the smart module 150, and/or (iii) an illumination characteristic of the state indicator (e.g., for power and/or network connectivity) of the smart module 150. The controller 108 can be configured to determine a state of the switching mechanism (e.g., based on position of the actuation mechanism and/or light indicator), and then operate the interface mechanism 112 to force the switching mechanism of the smart module 150 to be in a particular position or have a particular state coinciding with, for example, disconnecting the sensor interface of the smart module 150. FIG. 3A through FIG. 3C illustrate an example of an actuation module that operates separately from a smart module.

FIG. 1C illustrates a variation in which a sensing device assembly includes integrated actuation and network-enabled sensing modules. In an example of FIG. 1C, a sensing device assembly 180 includes a controller 170, an interface structure 172, a sensor module 174 and a smart module 178. In some examples, the controller 170 and the smart module 178 share the sensor module 174. The sensor module 174 may, for example, correspond to a sensor set (e.g., microphone, camera, infrared sensor, etc.) and accompanying logic (e.g., hardware and/or software) to read and/or process sensor data from the sensor set. The interface structure 172 can include, for example, a motor 182 and a connector interface 184. The motor 182 can move the connector interface 184 from a first position, where the connector interface 184 electrically connects the controller 170 to the sensor module 174, to a second position, where the connector interface 184 electrically connects the smart module 178 to the sensor module 174. In some examples, the motor 182 can be implemented as a magnet motor. More generally, in some examples, a magnetic mechanism, such as may be implemented by an electromagnet or combination thereof, may be used to move the connector interface 184 between the respective first and second positions. In such examples, magnetic forces (e.g., attraction and repulsion) may be used to move the connector interface 184 between the respective first and second positions.

In variations, the sensing device assembly 180 can include multiple housing structures which are coupled or integrated to enable functionality as described. For example, as described with some examples (e.g., see FIG. 6A and FIG. 6B), the sensing module 174 and the smart module 178 can be provided different housing structures that are interconnected to form an integrated assembly. In such examples, the interface structure 172, the motor 182, and/or the connection interface 184 can be provided with the housing structure of the sensing module 174 or with the housing structure of the smart module 178.

When the connector interface 184 is provided in the first position, the smart module 178 is non-responsive to events that are detectable to the sensor module 174, as the smart module 178 does not have use of the sensor module 174. Rather, the controller 170 can use the sensor module 174 to monitor a given region for a predetermined type of event, such as a voice command (e.g., when sensor module 174 includes a microphone) or a particular person that is near the sensing device assembly 180. Once the predetermined type of event is detected, the controller 170 can use the motor 182 to move the connector interface 184 to the second position, where the smart module 178 can use the sensor module 174 to detect and respond to events that are detectable by the sensor module 174. Thus, the smart module 178 has access to the sensor module 174 after the controller 170 detects a predetermined type of event.

In some variations, the controller 170 may further control the motor 182 and the connector interface 184, to cause the connector interface 184 to return to the first position after a second event (e.g., passage of time after a predetermined event is detected). The controller 170 can continue to monitor a given region using the sensor module 174.

As described with an examples of FIG. 4A through FIG. 4C, FIG. 5A through FIG. 5D, and FIG. 6A and FIG. 6B, the interface structure 172 can be implemented using a motorized housing that resides external to a respective smart module.

FIG. 2 illustrates an example method for operating an actuation module to control a network-enabled sensing device or module. An example method such as described by an example of FIG. 2 may be implemented using, for example, the actuation module 100 of an example of FIG. 1A, in conjunction with a smart module of an example of FIG. 1B. As an addition or variation, an example of FIG. 2 may be implemented using a sensing device assembly, such as described with an example of FIG. 1C. Accordingly, reference may be made to elements of FIG. 1A, FIG. 1B or FIG. 1C for purpose of illustrating a suitable component for performing a step or sub-step being described.

In an example of FIG. 2, the actuation module 100 performs an action to cause a smart module to be non-responsive to events of a class that exceed the threshold level of detectability (210). When non-responsive, the sensor interface 156 of the smart module 150 may be impaired or disabled. As an addition or alternative, the network port of the smart module may be disabled. Still further, the smart module a as a whole may be powered down so that the sensor interface 156 and/or network port are not operative. In variations, the actuation module 100 performs an action that corresponds to for example, a mechanical interaction between the controlled interface mechanism 112 of the actuation module 100 and a switching mechanism of the smart module 150. In another aspect, the action may correspond to a physical manipulation of the interface mechanism 112, or other structure to block or otherwise impede the operability of the sensor interface 156 of the smart module 150. Still further, the actuation module 100 may be electrically connected to the smart module 150 to electrically switch the sensor interface 156, network port, or the power level of the smart module 150.

While the smart module 150 is non-responsive to events of the class, the actuation module 100 may utilize the sensor interface 104 to monitor a given region for a predetermined type of event (220). For example, the actuation module 100 monitor the given region for sounds, and specifically for a word or group of words, using a microphone and accompanying audio detection and recognition logic as part of the sensor interface 104. In another example, the actuation module 100 may utilize a presence sensor (e.g., infrared sensor, heat sensor, occupancy sensor etc.) to monitor the given region for presence of humans or living objects. For example, the sensor interface 104 may detect a predetermined type of event corresponding to a person being in the given region (e.g., person walks into the given region which is within the operational vicinity of the sensor interface 156 of the smart module 150). Still further, the actuation module 100 can use face recognition to monitor the given region for presence of a particular person, such as a person that is pretty determined to have authorization to use the smart module 150. In such an example, the sensor interface 104 may include a camera (or set thereof) and face recognition logic. In other variations, the predetermined event or condition can correspond to, for example, environmental conditions (e.g., lighting) or some other predetermined or detectable condition or event.

In response to the actuation module 100 detecting the predetermined type of event, the actuation module 100 performs another action to cause the smart module 150 to be responsive to events of at least the class that exceed the threshold level of detectability (230). For example, the actuation module 100 may mechanically interact with the smart module 150 using the controlled interface mechanism 112, in order to manipulate a switching mechanism of the smart module 150 into an enabled state. As described with other examples, the switching mechanism may power the device to enable network connectivity, and/or enable the sensor interface 156. In other variations, the actuation module 100 can manipulate the interface mechanism 112, or other structure to enable the sensor interface 156. For example, the sensor interface 156 may be exposed, so that heat, light, or audio can be detected by corresponding sensors of the smart module 150 without impairment. When the smart module 150 is responsive, the sensor interface 156 is able to detect events of the class that exceed the threshold level of detectability, such as users providing audible commands to the smart module 150 using normal conversational voice levels. Additionally, in some examples, the smart module 150 can record, or otherwise transmit information about the detected events over its network port.

In other variations, the smart module 150 can operate to record and potentially compromise information about sensed activities in a local memory component that may removable or otherwise accessible to a third party. In such examples, the actuation module 100 may preclude the smart module 150 from sensing activities until the smart module is switched to the responsive state. In this way, the actuation module 100 can prevent the smart module 150 from sensing activities, or recording information about sensed activities in its local memory component.

FIG. 3A through FIG. 3C illustrate an example sensing device assembly, having a separate actuation device and smart device. In particular, an assembly 300 includes an actuation device 310 and a smart device 320, each having its own respective sensory input interface 312, 322. The actuation device 310 may include a base 302 having an extension 304 that is controlled by one or more internal components of the actuation device 310. The actuation device 310 can also include an integrated sensor, such as an audio sensor, camera, or occupancy sensor (e.g., infrared). The actuation device 310 can include logic for interpreting the output of the sensors. As described with some examples, the actuation device 310 can implement the logic to monitor for a predetermined type of event in a given region (e.g., room of a dwelling) where the sensor(s) of the actuation device 310 are operative. For example, the actuation device 310 can utilize a microphone and accompanying logic to detect and recognize certain words that correspond to commands. As another example, the actuation device 310 may include a camera that utilizes image recognition to the that the predetermined event or condition, such detection of a person walking in the room.

In an example of FIG. 3A through FIG. 3C, the smart device 320 can include a switching mechanism 324 that can be manipulated by user contact. Depending on implementation, the switching mechanism 324 may be pushed, touched, moved, or otherwise manipulated in its switching state from an off-state (e.g., low power state) to an on-state. When in the off state, at least one of the sensor interface or network port may be inoperative, occluded or otherwise made to be disabled. In a variation, the switching mechanism 324 may also switch the device to a sleep or off-state (e.g., low power state).

The actuation device 310 can control movement of the extension 304 to make contact with the switching mechanism 324. Depending on the design of the switching mechanism 324, the extension 304 can be controlled to, for example, touch, push, or manipulate the switching mechanism. By default, the actuation device 310 utilize the extension 304 to switch the smart device 320 into a non-responsive state. In some examples, the actuation device 310 may utilize a sensor (e.g., camera) to detect a marker (e.g., illumination color, pattern, physical state, etc.) of the switching state of the switching mechanism 324. For example, the switching mechanism 324 can include an illuminated feature to visually indicate a switching state of the switching mechanism 324, with different colors and/or illumination levels indicating a corresponding switching state. As an addition or variation, the actuation device 310 may utilize a sensor to detect a relative position or other visual attribute that is indicative of the switching state of the switching mechanism 324.

Once the actuation device 310 detects a predetermined type of event, the extension 304 may be operated to interface with and change the switching state of the switching mechanism 324. For example, the switching mechanism 324 may be touched or pressed, moved in position laterally, or otherwise manipulated in order to change the switching state. The sensing device 320 responds to the changed switching state by enabling its sensor interface and/or network port. The actuation device 310 may use the sensor to confirm the state change of the switching mechanism 324. In some examples, the actuation device 310 may change the switching state again, in response to another predetermined condition or event. For example, if the sensory input interface of the actuation device 310 fails to detect a predetermined condition or event after a given amount of time (e.g., presence of a person, an environmental condition such as lighting, movement, etc.), the actuation device 310 may operate the extension 304 again to cause the sensing device 320 to be non-responsive to events. For example, the extension 304 may touch, press or otherwise manipulate the switching mechanism 324 to the original position, coinciding with the non-responsive state.

FIG. 4A through FIG. 4C illustrate an example sensing device, having an actuation component that is integrated with a network-enabled sensing module. In particular, an assembly 400 includes an actuation module 410 that is operatively integrated with a smart module 420, to form the integrated assembly 400. Each of the actuation module 410 and the smart module 420 may include a respective sensor interface 412, 422.

In an example, the sensor interface 412 (e.g., microphone) of the actuation module 410 is provided within a housing 408 that can pivot on a surface of the smart module 420. A connector interface 402 may extend from the housing 408. The connector interface 402 may correspond to an electrical connector (e.g., ribbon connector) that electrically extends to the sensor interface 412 of the actuation module 410. The sensor interface 412 may include, for example, a microphone, camera, optical sensor and/or other type of sensor, as well as logic to process the sensor input.

In some examples, the actuation module 410 includes a motor that can operate to pivot the housing 408 between a disengaged position and an engaged position. In some examples, the actuation module 410 includes a magnet motor or mechanism to move the housing 408 between the disengaged and engaged positions. In the disengaged position, the sensor interface 412 of the actuation module 410 is enabled, and the position of the connector interface 402 causes the sensor interface 422 of the smart module 420 to be disabled. Additionally, in the disengaged position, the actuation module 410 uses the sensor interface 412 independently of smart module 420, to detect a predetermined type of event. For example, the sensor interface 412 may include a microphone that receives and processes audio input. The sensor interface 412 may monitor the sensor input for audio input that corresponds to a predetermined set of audible events, such as the utterance of a command.

When a predetermined event is detected, the actuation module 410 may be triggered to pivot the connector interface 402 into the engaged position, where it is received by a receptacle 414. In the engaged position, the connector interface 402 may electrically connect to the smart module 420 to enable the sensor interface 422 (e.g., additional microphone) of the smart module. In this way, the smart module 420 may use the sensor interface 422 to detect events that exceed threshold level of detectability. In this way, the smart module 420 may utilize its sensor interface 422 to detect a greater range or variety of events. As described with other examples, the smart module 420 can respond to sensed activity of the surrounding region by for example, recording data reflecting sensed events (e.g., in memory accessible to other users), and/or communicating data to an external network site using a network connection established through an integrated network port.

A visual indicator 425 may be provided with the smart module 420 to indicate whether the smart module 420 is in a responsive or non-responsive state. The visual indicator 425 may coincide with the responsive state of the smart module 420, so as to provide a user with a visual indication when the smart module is in the respective responsive and non-responsive states. For example, the visual indicator 425 may change color (e.g., between red and green) to reflect when the smart module 420 is in the non-responsive and responsive state, respectively.

FIG. 5A through FIG. 5D illustrate another example sensing device having integrated actuation and smart modules. In an example shown, a sensing device 500 includes an actuation module 510 having a sensor interface 512, and a smart module 520 having a sensor interface 522. The sensor interface 512 of the actuation module 510 includes a connector interface 502 that extends from a housing 508. The housing 508 may include a motor that can linearly move the connector interface 502 between a disengaged position and an engaged position. In variations, the housing 508 may use a magnetic motor or mechanism to move the connector interface 502 between disengaged and engaged positions. The connector interface 502 may correspond to an electrical connector that electrically extends to processing resources (e.g., integrated circuit, microprocessor) of the sensor interface 512, maintained within the housing 508. The sensor interface 512 may be implemented using one or more multiple types of sensors, such as for example, a microphone, a camera, an occupancy sensor and/or other type of sensor.

As shown by an example of FIG. 5A, when the connector interface 502 is in the disengaged position, the connector interface 502 is physically apart and disconnected from the smart device 520. In the disengaged position, the sensor interface 512 is operative as part of the actuation module 510 to detect a predetermined type of event. For example, the sensor interface 512 can include a microphone that receives and processes audio input. The sensor interface 512 may thus monitor for audio input that corresponds to a predetermined set of audible events, such as the utterance of a command, independent of the operation of the smart module 520.

FIG. 5B illustrates that the actuation module 510 moving the connector interface 502 into a connector receptacle 514 of the smart module 520. In the engaged position, the smart device 520 switches from the disengaged to the engaged position. As described with other examples, the actuation module 510 can move the connector interface 502 as a response to the sensor interface 512 detecting a predetermined type of event (e.g., voice command).

In the engaged position, the connector interface 502 may electrically enable the sensor interface 522 of the smart module 520. The smart module 520 utilizes its sensor interface 522 to detect a greater range or variety of events as compared to the actuation component 510. In this way, the smart module 520 may respond to sensed activity of the surrounding region. In an example, the sensor interface 522 of the smart module 520 may be of a first type (e.g., microphone), while the sensor interface 512 of the actuation module 510 is of a second type (e.g., camera, occupancy sensor).

In an example, a visual indicator 525 is provided with the smart module 520 to indicate whether the smart module 520 is in a responsive or non-responsive state. When the smart module 520 is provided with sensing capabilities, the visual indicator 525 may be provided to indicate the responsive state of the actuation module 510. The visual indicator 525 may serve as a notification to a user. When the smart module 520 is in the connected state, the visual indicator 525 can provide notification that the device may, for example, communicate sensed activities of its sensor interface 512 over a network connection.

FIG. 5A and FIG. 5B illustrate the actuation module 510 moving from the disengaged position to the engaged position. The visual indicator 525 may switch from a first illumination state (e.g., red) to a second illumination state (e.g., green). The actuation module 510 may switch in response to, for example, a microphone of the actuation module detecting a specific word or command. The user may speak the command in the presence of the sensor interface 512 of the actuation module 510, when, for example, the visual indicator 525 indicates the smart module 520 is in the non-responsive state. In one example, the smart module 520 remains in the responsive state for a given duration of time after being switched. In a variation, the smart module 520 remains in the responsive state for a given interval of inactivity. For example, the smart module 520 may switch from the engaged position to the disengaged position in response to a timed condition, such as an interval of time during which the sensor interface 522 of the smart module 520 fails to detect activity. As an alternative or variation, the smart module 520 may be switched to the disengaged position by a sensed (or not sensed) activity of the sensor interface 512 of the actuation module 510.

As shown by FIG. 5C and FIG. 5D, once a condition (e.g., interval of inactivity) is detected to cause the smart module 520 to switch back, the actuation module 510 translates to the disengaged position, and the visual indicator 525 switches illumination state to reflect that the smart module 520 is in the non-responsive state. In the non-responsive state, the smart module 520 does not detect events that are otherwise be detectable by its sensor interface 522.

FIG. 6A and FIG. 6B illustrate another example of an integrated sensing device. As shown by FIG. 6A and FIG. 6B, an integrated sensing device 600 includes a housing structure 610 and a sensor interface 622 (e.g., microphone as shown). The housing structure 610 may be formed as a shell structure that can overlay a smart module (not separately shown in FIG. 6A and FIG. 6B). In variations, the housing structure 610 can shroud a smart module provided within an interior. The sensor interface 622 can be integrated with the housing structure 610, and accessible by respective actuation and smart modules of the device 600.

In an example, the housing structure 610 can be integrated with an actuation module (not shown in FIG. 6A and FIG. 6B) to rotate from a disengaged position (FIG. 6A) to an engaged position (FIG. 6B). In the disengaged position, the sensor module is disconnected from the smart module that is to be controlled. The sensor interface 622 can operate as an extension of a sensor module, to detect a predetermined type of sensor input. Once detected, the sensor module may signal a trigger to the actuation, which causes the actuation module to pivot the housing structure 610 from the disengaged position to the engaged position. In the engaged position, the input detected by the sensor interface 622 is processed by the smart module.

The actuation module (not show in FIG. 6A and FIG. 6B) can be integrated or otherwise provided with the housing structure 610 and the sensor interface 622. In variations, the actuation module may be implemented separately from the housing structure 610. For example, the actuation module may be implemented using hardware that is distinct from the housing structure 610. In variations of such an example, the actuation module 610 may be integrated with the smart module. Alternatively, the actuation module and the smart module may each be implemented using separate hardware, apart from the housing structure 610.

In an example of FIG. 6A and FIG. 6B, the sensor interface 622 has a physical presence on an exterior of the housing structure 610, so as to move with the housing between the alternative positions. The relative position of the sensor interface 622 can be used to expose alternative visual markers 625, 626 for each of the respective positions. The alternative visual markers 625, 626 can be used to indicate whether the smart module of the device 600 is in a responsive or non-response state.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. An actuation module comprising:
   a sensor interface of at least one sensor to sense a predetermined type of event in a given environment, and to generate a trigger signal upon sensing the predetermined event;
   an actuator to interface with a sensing module in response to detecting the trigger signal, the sensing module being capable of detecting a class of events that exceed a threshold level of detectability;
   wherein the actuator is to mechanically interact with the sensing module to disable the sensing module via a physical action to cause the sensing module to be non-responsive to events of the class that exceed the threshold level of detectability until the actuator is triggered by the sensor interface, and wherein the actuator is to respond to the trigger signal by causing the sensing module to be responsive to events of the class that exceed the threshold level of detectability.

2. The actuation module of claim 1, wherein the actuation module is to cause the sensing module to be non-responsive to events of the class that exceed the threshold level of detectability by physically interacting with a switch of the sensing module via the actuator in order to disable the sensing module by switching the sensing module into one of an unconnected or unresponsive state.

3. The actuation module of claim 2, wherein the actuation module is to use the sensor interface to detect an indicator of the switch before switching the sensing module into the unconnected or unresponsive state.

4. The actuation module of claim 1, wherein the actuator is to cause the sensing module to be non-responsive to events of the class that exceed the threshold level of detectability by impeding or disabling a sensor interface of the sensing module.

5. The actuation module of claim 1, wherein the actuator is to cause the sensing module to be non-responsive to events of the class that exceed the threshold level of detectability by disconnecting the sensing module from a network.

6. The actuation module of claim 1, wherein the actuator is to cause the sensing module to be non-responsive to events of the class that exceed the threshold level of detectability by causing the sensing module to power down into a low power state.

7. The actuation module of claim 1, wherein the sensor interface includes at least one of a microphone, camera or occupancy sensor to detect the predetermined type of event in the given environment.

8. The actuation module of claim 1, wherein the sensor interface includes a camera that is to recognize the predetermined type of event from image data.

9. The actuation module of claim 1, wherein the actuator includes an extension to manipulate a physical barrier that impedes or occludes the sensor interface of the sensing module until the trigger signal is detected.

10. The actuation module of claim 9, wherein the physical barrier is to cover the sensor interface of the sensing module until the trigger signal is detected, and wherein the physical barrier is to be moved by the actuator to expose the sensor interface of the sensing module in response to the trigger signal being detected.

11. The actuation module of claim 1, wherein the actuator includes an electrical interface that is to respond to the detected trigger signal by switching the sensing module from a responsive connected state to an unresponsive or unconnected state.

12. The actuation module of claim 1, wherein the actuator includes a mechanical controller that is to control movement of an extension that physically contacts a feature or portion of the sensing module in order to switch the sensing module from a responsive connected state to an unresponsive or disconnected state.

13. The actuation module of claim 12, wherein the actuator is programmable to enable movement of the extension to a plurality of positions, in order to accommodate multiple types devices as the sensing module.

14. An apparatus comprising:
    a sensing module, operable in a responsive, connected state, the sensing module including a sensor interface that is capable of detecting a class of events that exceed a threshold level of detectability;
    an actuation module, operatively coupled to the sensing module to control physically via an actuator, the actuation module including a sensor interface of at least one sensor to sense a predetermined type of event in a monitored region;
    wherein the actuation module responds to the sensor interface detecting the predetermined type of event by switching the sensing module from an unresponsive state to the responsive connected state, the actuator to switch the sensing module via a mechanical interaction that includes a physical action.

15. A method for controlling a connected sensing module, the method comprising:
    performing at least a first action to cause a sensing module, physically via an actuator, to be non-responsive to events of a class that exceed a threshold level of detectability, the first action including the actuator mechanically interacting with the sensing module via a first physical action;
    while the connected sensing module is non-responsive to events of the class, monitoring a given region for a predetermined type of event;

in response to detecting the predetermined type of event, performing at least a second action to cause the sensing module, physically via the actuator, to be responsive to events of at least the class that exceed the threshold level of detectability, the second action including the actuator mechanically interacting with the sensing module via a second physical action.

16. The actuation module of claim 1, wherein the actuator is an articulated mechanical device to perform the physical action to mechanically interact with the sensing module by causing a portion of the articulated mechanical device to physically contact a portion of the sensing module.

17. The actuation module of claim 1, wherein the actuator is to perform the physical action to mechanically interact with the sensing module by causing a portion of the sensing module to change physical positions to cause the sensing module to become non-responsive to the events of the class that exceed the threshold level of detectability.

18. The actuation module of claim 1, wherein the actuator is to perform the physical action to mechanically interact with the sensing module by causing a field of view of the sensing module to be obstructed.

19. The apparatus of claim 14, wherein the actuator is an articulated mechanical device to perform the physical action to mechanically interact with the sensing module by causing a portion of the articulated mechanical device to physically contact a portion of the sensing module.

20. The method of claim 15, wherein the actuator is to perform the first physical action to mechanically interact with the sensing module by causing a portion of the sensing module to change physical positions to cause the sensing module to become non-responsive to the events of the class that exceed the threshold level of detectability.

* * * * *